(12) United States Patent
Honnorat

(10) Patent No.: US 8,408,643 B2
(45) Date of Patent: Apr. 2, 2013

(54) SEAT FOR POWERED AIRCRAFT, THE SEAT INCORPORATING MEANS FOR PROTECTING ITS PASSENGER IN THE EVENT OF A CRASH

(75) Inventor: Olivier Honnorat, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 405 days.

(21) Appl. No.: 12/893,014

(22) Filed: Sep. 29, 2010

(65) Prior Publication Data

US 2011/0079681 A1 Apr. 7, 2011

(30) Foreign Application Priority Data

Sep. 30, 2009 (FR) .................................. 09 04669

(51) Int. Cl.
*B60N 2/42* (2006.01)
(52) U.S. Cl. ............. 297/216.1; 297/216.17; 244/122 R
(58) Field of Classification Search ............... 297/216.1, 297/216.17; 244/122 R
See application file for complete search history.

(56) References Cited

U.S. PATENT DOCUMENTS

| | | | | |
|---|---|---|---|---|
| 3,059,966 A | * | 10/1962 | Spielman | 297/216.17 |
| 3,985,388 A | * | 10/1976 | Hogan | 297/216.17 |
| 4,358,154 A | * | 11/1982 | Campbell | 297/216.17 |
| 4,523,730 A | * | 6/1985 | Martin | 244/122 R |
| 5,273,240 A | | 12/1993 | Sharon | |
| 5,842,669 A | * | 12/1998 | Ruff | 244/122 R |

FOREIGN PATENT DOCUMENTS

| | | |
|---|---|---|
| DE | 4312343 A1 | 10/1994 |
| EP | 0659642 A1 | 6/1995 |
| EP | 0814020 A2 | 12/1997 |
| FR | 2495101 A1 | 6/1982 |
| FR | 2683191 A1 | 5/1993 |

OTHER PUBLICATIONS

Search Report and Written Opinion; Application No. FR 09 04669; dated May 11, 2010.

* cited by examiner

*Primary Examiner* — Anthony D Barfield
(74) *Attorney, Agent, or Firm* — Brooks Kushman P.C.

(57) ABSTRACT

A seat for a powered aircraft, the seat comprising a bucket (2) that is supported in hyperstatic manner on a stand. Leg members (7, 8) carry the bucket (2) via bolts (10). A first hinged mechanism for geometrically compensating deformation of the floor associates a ball-joint mounting of the bolts (10) on the leg members (7, 8) with an axial deformation arrangement of the bolts (10) between opposing axial bearing surfaces where they press against a strength member (9) of the bucket (2) and against the leg members (7, 8). A second energy-absorber mechanism associates fuses (22) with deformable support members (23) for the bucket (2), which members engage the bolts (10) and the leg members (7, 8) via slides (25) arranged to adjust the initial height position of the bucket (2).

22 Claims, 3 Drawing Sheets

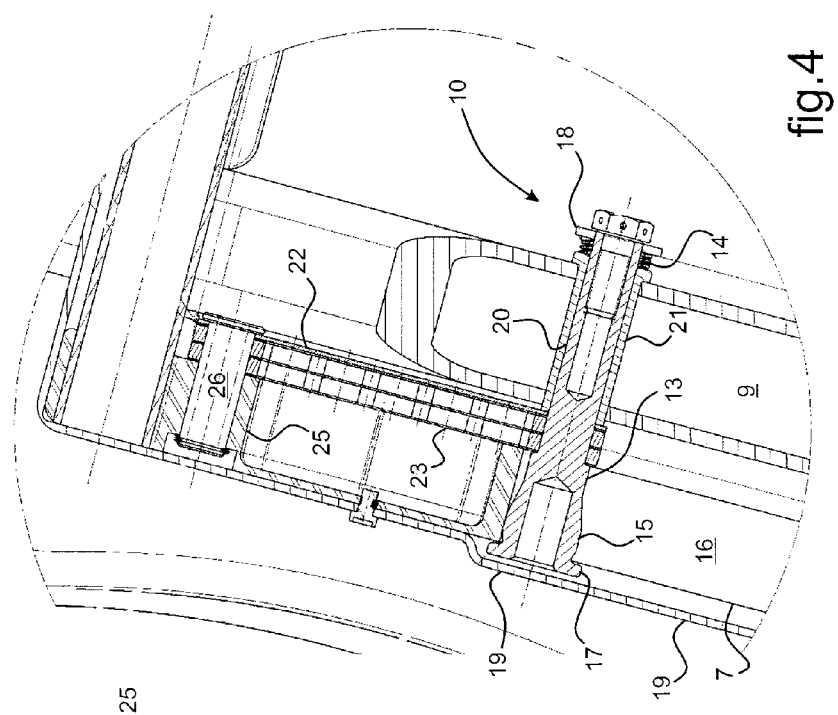
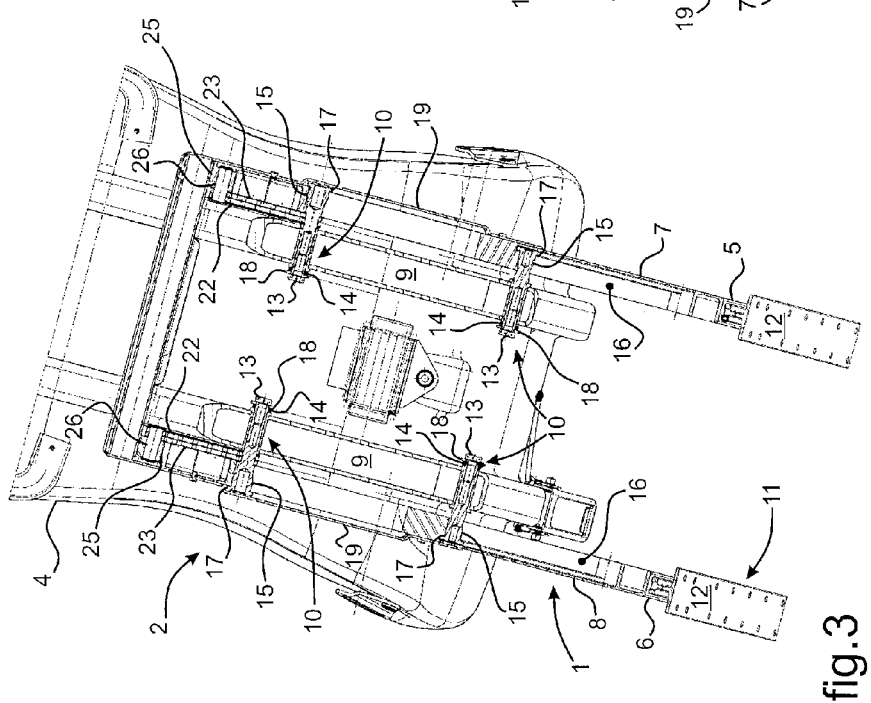

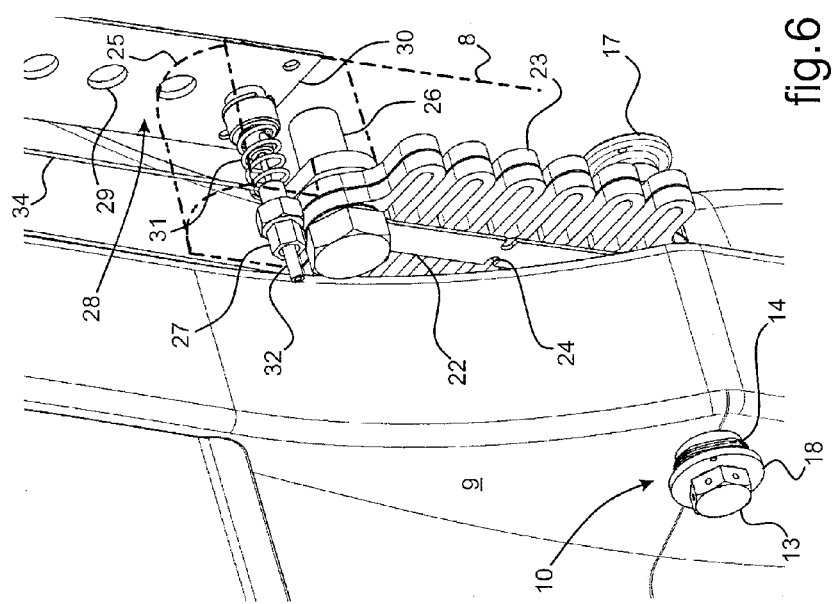
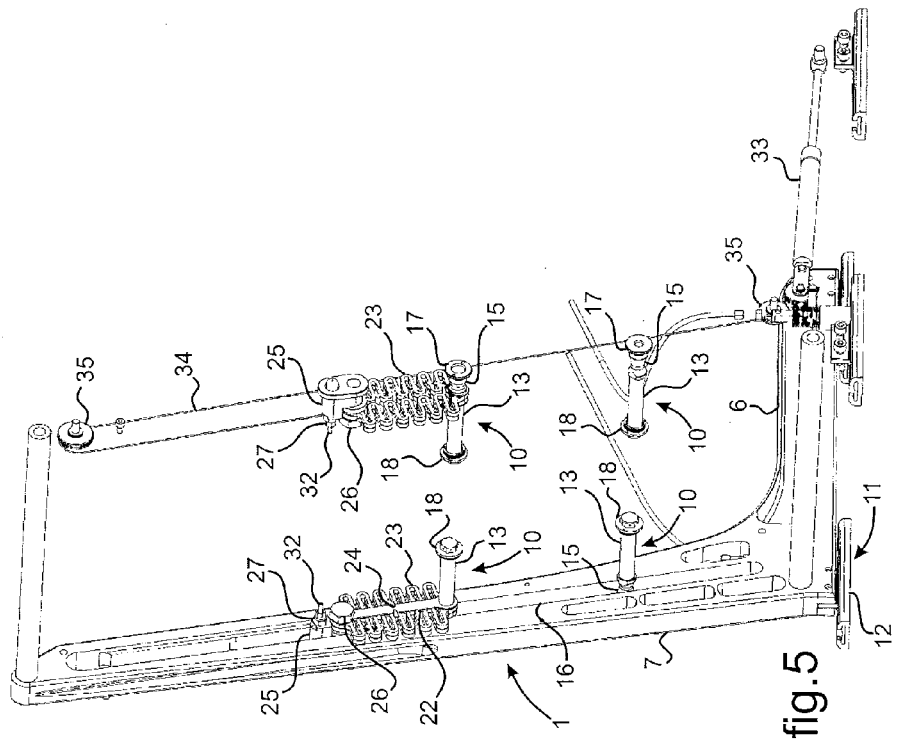

SEAT FOR POWERED AIRCRAFT, THE SEAT INCORPORATING MEANS FOR PROTECTING ITS PASSENGER IN THE EVENT OF A CRASH

CROSS REFERENCE TO RELATED APPLICATION

This application claims the benefit of application no. FR 09 04669 filed Sep. 30, 2009, the disclosure of which is incorporated herein by reference.

FIELD OF THE INVENTION

The present invention relates to the field of powered aircraft, in particular airplanes and helicopters, and more particularly it relates to the field of accessories for fitting to such aircraft. The invention provides a seat for powered aircraft, the seat incorporating means for protecting its passengers in the event of the aircraft being subjected to a violent impact and/or a sudden change of speed, in particular during a crash.

BACKGROUND OF THE INVENTION

The seats for powered aircraft, such as airplanes, rotorcraft, in particular helicopters, or analogous powered aircraft, incorporate means for protecting a passenger sitting on the seat in the event of a crash. The term "passenger" should be understood as covering any person on board the aircraft, whether the pilot or a person being transported. Such protection means are commonly constituted by energy-absorber means that are adapted to compensate for the stresses to which the seat is subjected in the event of violent impacts and/or sudden deceleration, in particular in the event of a crash. More particularly, the seat is commonly organized to compensate for deformation of the floor of the aircraft, and to absorb the energy induced by the forces to which the aircraft is subjected overall in the event of a crash. In a common embodiment, the seat associates a stand and a bucket comprising a seat proper with a back extending up therefrom. The stand is anchored to the floor of the aircraft via foot members and it includes leg members that are secured to the foot members and that together carry the bucket. The connection between the bucket and the leg members is of the type using pins or analogous members, being implemented by means of bolts that are mounted to engage simultaneously in the seat back and in the leg members.

Directions and positions that are said to be "lateral" are those associated with the sides, that are said to be "longitudinal" are associated with the front and the rear, and that are said to be "transverse" or "vertical" should all be taken into consideration relative to the position of a passenger installed on the seat.

There then arises the general problem of arranging passenger protection means that are incorporated in the seat. It is necessary for the bucket to be firmly held on the stand under normal conditions of operation of the aircraft. The seat must be structured to be capable of compensating deformation of the floor and also to be capable of absorbing the energy induced by the forces to which the seat is generally subjected in the event of a crash because of the sudden change in the speed of the aircraft.

More particularly, in the event of the aircraft crashing, deformation of the floor causes the stand to be deformed, and more particularly its foot members. The seat must be structured so as to compensate the forces on the passenger as a result of geometrical deformation, it being commonly accepted by way of indication that such deformation is an angular deflection of not more than about ±10°. This angular offset is considered in particular on either side of the initial installation plane of the seat in the aircraft. In order to avoid making its structure more complex and in order to avoid increasing the size and the weight of the seat, such deformation of the floor is traditionally compensated by distorting the stand and/or by the bucket being flexible. Nevertheless, such arrangements are not satisfactory since their implementation is often evaluated empirically on the basis of tests carried out in a laboratory, to the detriment of any rigorous approach that would be preferable, given the requirements relating to protecting passengers. Such a procedure leads to organizing the seat in a manner that is specific to predetermined crash situations and to corresponding modes of deformation of the stand that are estimated as being probable. Nevertheless, in practice, the way a crash takes place is random and may give rise to unpredictable effects on the aircraft and on the conditions of stand deformation. It would appear to be desirable for the structure of the seat to be organized so as to enable the effects of stand deformation to be compensated regardless of the stresses to which the seat might be subjected in any kind of crash situation.

In the event of the aircraft being subjected to a sudden change in speed, and in particular to strong deceleration, the seat needs to be organized to protect the passenger from the effects of such a change in the speed of the aircraft. A specific mechanism is traditionally used in order to absorb the energy induced by the high forces to which the seat is subjected overall during a crash. This mechanism for absorbing the energy induced by a sudden change in the speed of the aircraft is in particular interposed between the stand and the bucket. For example, it is known to mount the bucket slidably on the leg members of the stand so that it can be moved under the effect of a force having at least one component oriented along the gravity axis and/or passing transversely through the floor of the aircraft. Such a sliding mount is implemented using bolts that engage the seat back of the bucket and that are suitable for traveling along respective members for guiding movement in translation, such as rails or slideways, forming parts of the leg members of the stand. The bolts are prevented from sliding along the leg members by deformable retaining means, such that under normal operating circumstances of the aircraft the bucket is held firmly, but the stresses that are induced on the aircraft in the event of a crash cause the retaining means holding the bucket to the stand to deform.

For further information about the technological environment of the present invention, reference may be made to the following documents: FR 2 683 191 (Israel Aircraft Industries Ltd.); DE 4 312 343 (Eurocopter D. GmbH); or EP 0 814 020 (Martin-Baker Aircraft Co. Ltd.).

SUMMARY OF THE INVENTION

It is advantageous for protecting passengers in the event of the aircraft crashing to consider the following requirements relating to:

the size of the seat, which should be as small as possible, in particular laterally and rearwards so as to optimize seat spacing. For a given number of seats fitted to the aircraft, small individual size of each seat serves to avoid hindering passengers installed on adjacent seats, and enhances the arrangement of aisles and/or storage space inside the aircraft. In addition, for given reception capacity of the aircraft, compact seats enable the number of seats to be increased and makes them easier to implant inside any aircraft;

the structure of the seat which needs to be as simple as possible in order to avoid increasing its weight, since that is harmful for an aircraft. In addition, simplicity of structure makes it possible to obtain a seat at lower cost, and facilitates any maintenance operations;

facility(ies) enabling the passenger to adjust the position of the seat, such as adjusting its initial height position and/or its backward/forward longitudinal position. The arrangement of the means for protecting the passenger must not interfere with, nor make excessively complicated, the means used for performing such adjustments, so as to avoid increasing the size and the weight of the seat, and/or so as to avoid making operating the adjustment means difficult for the passenger.

One object of the present invention is to propose a seat for a powered aircraft that incorporates means for protecting the passenger installed on the seat in the event of the aircraft suffering a violent impact, in particular in the event of a crash. The present invention seeks more particularly to propose such a seat that incorporates a mechanism that is specifically dedicated to protecting the passenger from deformation of the floor, regardless of the stresses produced by such deformation. It is desirable for such a mechanism at least to satisfy requirements, and to overcome the above-mentioned difficulties in the context of the problems to be solved. It is also desirable for such a mechanism advantageously to be suitable for operating independently of and/or in co-operation with another mechanism that is specifically dedicated to protecting the passenger from a sudden change in the speed of the aircraft in the event of a crash.

The seat of the present invention in one embodiment is arranged to be fitted to a powered aircraft, such as an airplane or a rotorcraft, in order to protect a passenger in the seat in the event of a sudden change in speed and/or in the event of an impact during a crash of the aircraft. It is recalled that for an aircraft of such a type, the impacts to which it is subjected are applied mainly along the general gravity axis, and also in transverse directions that may be arbitrary relative to said general gravity axis. These shocks subject the seat to high levels of stress by presenting forward and/or lateral components depending on the position and the orientation with which the seat is installed in the aircraft, and depending on the orientation of the aircraft relative to the ground at the time of the crash. Such stresses tend to deform the plane on which the seat is installed inside the aircraft, as represented by the aircraft floor.

The seat mainly comprises a bucket that is supported in hyperstatic manner on a stand. The bucket is made up of a seat proper having a seat back rising therefrom, and the stand has foot members anchoring the seat in its utilization position on an installation plane, in particular the floor of the aircraft. Supporting the bucket in hyperstatic manner corresponds more particularly to it being supported by the stand via a plurality of engagement points or zones that are distributed laterally and vertically relative to the bucket.

There are preferably four of these engagement points, and they are arranged in laterally spaced-apart pairs. The engagement points of each pair are more particularly arranged in a high zone and in a low zone of the bucket when the seat is in its utilization position, and more specifically a high zone and a low zone of the seat back.

Respective leg members are secured to the foot members of the stand and together they carry the bucket by pinning engagement via axially-extending bolts. One of the ends of each bolt engages a strength member of the seat back while its other end engages a dedicated leg member. The leg members are laterally spaced apart so as to distribute said points of engagement, and they are preferably located behind the bucket. The strength member of the seat back is generally likely to be constituted by a pair of beams or analogous members engaged on the seat proper and the seat back, each of these beams being associated with a dedicated one of the leg members for the purpose of supporting the bucket in hyperstatic manner.

More particularly, in one embodiment, the seat of the present invention is fitted with a first hinged mechanism for geometrically compensating deformation of the floor regardless of the orientation of the forces to which the stand is subjected and regardless of the magnitude of these forces within a predetermined range of stresses. More particularly, this first mechanism is a hinged mechanism that is specifically suitable for compensating deformation of the floor, such that the plane on which a passenger is sitting remains substantially constant in the event of the stand being deformed. Such deformation of the stand corresponds to that commonly accepted in the field of aircraft in terms of passenger safety, i.e. angular tilting of the foot members on either side of the plane on which the seat is installed by an angle of about 10°.

The first mechanism proposed by the present invention associates a ball-joint mount for the bolts together with them being arranged for axial deformation. The ball-joint mounting of the bolts is preferably implemented with said dedicated leg member, however it could be implemented equally well with the dedicated leg member or with the strength member of the seat back. The axial deformation arrangement of the bolts is more particularly arranged between opposing axial bearing points that they press against the strength member of the seat back and against the dedicated leg member.

The ball-joint mounting of the bolts and their suitability for deforming axially as a consequence enables deformation of the floor to be compensated regardless of the particular deformation induced by forces that may act in any direction and in random manner. A passenger in the seat is protected against any deformation of the floor, including deformation that has not been previously studied, in particular by testing. The structure of the first mechanism is simple, easy to obtain from an inexpensive arrangement of bolts, gives rise to very little or no extra bulk in the junction zone between the stand and the bucket, and does not require significant extra weight to be added. In addition, the organization of the first mechanism does not oppose simple and easy arrangement of other pieces of equipment of the seat, such as a second mechanism for absorbing the energy induced by a sudden change in the speed of the aircraft, and/or means for adjusting the initial height position of the bucket.

The bolts are suitable for tilting in any direction while retaining positive opposing thrust forces against the leg members and the strength member of the back. The suitability of the bolts for tilting is determined depending on their suitability for deforming axially between two extreme abutment positions. These extreme abutment positions correspond respectively to a position of the leg members when the seat is installed in the aircraft in compliance with an installation plane, and a maximum authorized deformed position of the foot members relative to said installation plane.

The simplicity of the structure of the first mechanism makes it possible to optimize the working stroke of the bolts in axial deformation, so as to satisfy requirements for compensating deformation of the foot members corresponding to a said angular offset of about 10° relative to the installation plane. The association of the ball-joint mounting of the bolts with their capacity to deform axially implies that their movement relative to the dedicated leg member or to the strength member of the back can be controlled easily. The axial bearing engagements of the bolts against the leg members and against the strength member of the back continue to exist in positive manner, i.e. thrust is firm and controlled, regardless of the angle of inclination of the bolts within the predetermined range for authorized axial deformation thereof. In the event of a foot member deforming as a result of the installation plane of the seat in the aircraft deforming, the bucket does not tend to accompany the stand in its deformation, nor is it itself subjected to deformation in spite of being supported in hyperstatic manner. The ball-joint mounting of the bolts serves to reduce the twisting stresses to which the bucket would otherwise be subjected in the event of the seat installation plane deforming, and this applies regardless of the orientation of the forces to which the foot members are subjected during deformation.

The opposing axial bearing engagements of the bolts between their two extreme axial deformation positions guarantee both that the bucket is held firmly in normal utilization of the seat when the foot members are not deformed, and secondly that the bucket continues to be held firmly after the seat installation plane has been deformed. The operation of the first mechanism, its conditions of implementation, and the firm retention of the bucket in the normal sitting position for the passenger are all obtained independently of any possible implementation of a second energy-absorber mechanism specifically dedicated to protecting the passenger by allowing for relative movement in translation between the leg members and the strength member of the seat back in the general direction in which they extend. More particularly, the deformations of the floor are specifically taken into account by the first mechanism, which first mechanism is suitable for being implemented independently of any implementation of a second mechanism for absorbing energy induced by a sudden change in the speed of the aircraft.

The deformation of the stand corresponding to an angular shift of the foot member of the order of 10° on either side of the seat installation plane is given as an indication and may be adapted depending on requirements and/or depending on constraints and security requirements. The organization of the first mechanism makes such adaptation easy, starting from an adjustment that is structurally simple to implement concerning the ability of the bolts to deform axially between said extreme abutment positions. Such angular movement of the foot member through about 10° gives rise to a change of position between the bucket and the corresponding leg member of the order of 1/cos(10°), i.e. 1.5%. The axial deformation stroke of the bolts is consequently small and easily controllable, and may be obtained structurally in simple manner by interposing resilient means between one and/or the other of the bearing points between the bolts and the dedicated leg member and/or the seat back, and by allowing the bolts to slide within at least one of said leg members. Such resilient means are likely to be of robustness suitable for holding the bucket firmly and stably in hyperstatic manner, without that making the structure thereof more complex.

More particularly, the bolts are axially deformable over a predefined stroke between two axial abutment positions that correspond to predefined respective extreme thresholds for axial deformation of the bolts as a function of said security requirements.

The spherical bearing surfaces for the bolts may be located equally well on the dedicated leg member or on the strength member of the back, and they are preferably limited to movement over a range of 3° to 7°, so as to avoid the first mechanism occupying useless space, and in particular so as to avoid the bolts and the housings that receive them respectively occupying useless space. Such a restriction on the spherical bearing surfaces of the bolts is made possible by the way in which the first mechanism is implemented, which is advantageously controlled by the predefined axial deformation stroke of the bolts.

In an advantageous embodiment, each of the bolts is arranged as:
 a tilt pin having shoulders for applying opposing axial forces against the leg member and the strength member of the back. The tilt pin has a ball-joint head suitable for co-operating with a housing that may be formed equally well in the strength member of the back or in the dedicated leg member; and
 at least one axially deformable resilient sleeve engaged on the tilt pin axially between at least one of said shoulders and respectively the dedicated leg member and the strength member of the back against which it bears.

In an advantageous embodiment, the resilient sleeve is made up of a stack of dish-shaped washers of the "Belleville" type.

Preferably, the housings for receiving said ball-joint head are blind housings suitable for preventing the corresponding ends of the tilt pins from escaping from the housings that receive them. Such an escape might occur under the effect of the stand deforming and/or under the effect of the various forces to which the seat is subjected during a crash, and would run the risk of deforming the walls of the housings.

In order to arrange such blind housings without interfering with or hindering the mounting of the bolts, and without excessively increasing the weight of the seat, the housings include an outwardly-directed opening allowing the bolts to be passed through them in order to be mounted. This opening is provided with a cap that is fitted thereover or with some analogous member for closing the housings and for reinforcing their walls. Such a cap makes it possible to conserve the geometrical shape of the housings in spite of the forces to which the seat is subjected and to guarantee optional implementation of a said second mechanism, in particular in the event of the second mechanism making use of the bolts that form part of the first mechanism. Such closure of the housings is applied in particular to the housings situated in the low position of the back, said zone being the zone that is the more stressed during deformation of the seat installation plane.

Nevertheless, it is preferable for all of the housings to be provided with such a cap, including the housings situated in the high position of the back, so as to avoid affecting the stiffness of the seat in a lateral direction and so as to avoid any risk of the bucket tilting sideways during a crash.

The bolts are suitable for being mounted equally well and in equivalent manner in the dedicated leg members or in the strength member of the back. Nevertheless, an embodiment is preferred in which the bolts are ball-joint mounted in respective said housings included in the leg members, while being slidably mounted within an axial recess included in the strength member of the seat back, and in particular between two said abutment positions. Such a distribution between the leg members and the strength member of the back for the mountings of the bolts makes them easier to use for incorporating a said second mechanism in the seat, which second mechanism is specifically dedicated to absorbing energy induced by the sudden change in speed of the aircraft during a crash.

The seat is preferably fitted with a said second mechanism for absorbing the energy induced by a sudden change of speed of the aircraft and to which the seat is subjected.

Advantageously, such a second mechanism comprises at least two sets of members, each associating a fuse for retaining the bucket in a hyperstatic manner, and a deformable member for supporting the bucket. Each set of members is engaged together on a dedicated leg member and on the strength member of the back.

The fuse serves to set the threshold at which the second mechanism comes into operation. The fuses may be constituted in particular by members that are suitable for breaking under the effect of the seat being subjected to large forces during a crash, while withstanding the effect of forces induced by a reference passenger sitting down on the seat.

In an advantageous embodiment, the bolts of the first mechanism are used at least in pairs, being distributed laterally for mounting the second mechanism. More particularly, the fuse and the support member of each of the sets of members are advantageously engaged on a bolt that is associated therewith and on the dedicated leg member. The housing for receiving the ball-joint head of the bolt extends along said dedicated leg member. The sets of members may be installed equally well in the high position, in the low position, and/or both in the high position and in the low position of the back.

By way of example, the fuse may be arranged as a bar having a zone of weakness. The deformable support member is arranged as a generally flat spring that is deployable in plastic deformation by the successive bars making it up being pulled away from one another.

The seat is preferably fitted with means for adjusting the height position of the bucket.

In an advantageous embodiment, the means for adjusting the height position of the bucket comprise a ratchet mechanism. Such a ratchet mechanism associates in particular a set of two pawl fingers carrying the bucket, each pawl finger being associated with a dedicated leg member, and racks of notches for receiving the pawl fingers that are arranged for receiving the pawl fingers in alternation, which notches are arranged in succession along each of the leg members. The notches of a rack are preferably arranged through a plate that is fitted onto a dedicated leg member. The plate is suitable for being made out of a robust material, such as steel, which is analogous to the material from which the pawl fingers are made and which is different from the material from which the leg members are formed, said leg members advantageously being made of an aluminum alloy, for example, or from some other light alloy. Degradation of the pawl fingers as a result of repeated use is avoided and the stand may be made from a lighter material, such as aluminum, without any risk of being weakened by the presence of the notches. The housings provided in a given leg member for the bolts installed in the high and low positions of the back are preferably joined together to form a common housing extending along the corresponding leg member. The passage of any pawl finger between two notches in the rack that is associated therewith takes place by the pawl fingers being mounted to be movable along the leg members.

Each of the pawl fingers advantageously carries the bucket via a bolt that is associated therewith and with which it is in engagement.

The pawl fingers advantageously engage the bolts via the corresponding second mechanisms.

Preferably, the pawl fingers are guided in their movements by slides that support them respectively. The slides are mounted to move along corresponding slideways or analogous members for providing guidance in translation, which slideways are formed through the leg members.

In an advantageous embodiment, such slideways are constituted, where appropriate, by the housings for receiving the bolts in the leg members, which housings extend along the leg members over practically all of their height. More particularly, said slides also constitute members for engaging the sets of members constituting the second mechanism on the leg members, and the slideways for receiving the slides are constituted by the housings for receiving the bolts.

The means for adjusting the height position of the bucket preferably comprise means for driving the pawl fingers between two positions. A first position is a spontaneous notching position in which the pawl fingers are received in one of said notches in the corresponding rack. A second position is a disengaged position in which the pawl fingers are extracted from the notches.

In a preferred embodiment, the means for driving the pawl fingers comprise a traction member for pulling the pawl fingers into the disengaged position against an opposing force exerted by a resilient member for spontaneously driving the pawl fingers into the notching position. By way of example, the traction member may be of the pull rod type suitable for being operated manually, or any other analogous traction member.

The means for adjusting the height position of the bucket advantageously include at least one member for driving the height position of the bucket.

Preferably, the bucket drive member is a member for spontaneously driving the bucket towards an optimum high position, which is rated to a predetermined force corresponding in particular to the weight of a reference passenger sitting on the seat. The predetermined rated force of the bucket drive member is less than the rated force causing the fuse to break. In an advantageous embodiment, the bucket drive member is constituted by a pneumatic actuator or by any other analogous elastically deformable member.

The bucket drive member is advantageously placed in the bottom portion of the seat defined between the foot members. Such dispositions enable the means for adjusting the height position of the bucket to be housed within the overall dimensions of the seat. The bucket drive member is in engagement, in particular, with at least one of the pawl fingers via a cable that runs over a set of deflection pulleys, or analogous members, that are mounted on the stand.

BRIEF DESCRIPTION OF THE DRAWINGS

Embodiments of the present invention are described with reference to the figures of the accompanying sheets, in which:

FIGS. 1, 2, and 3 show one embodiment of a seat of the present invention, respectively in a lateral isometric view, in a rear isometric view, and in a rear section;

FIG. 4 shows a detail of an embodiment of a seat of the present invention, showing the mounting of a bolt used by the mechanism for protecting the passenger in the event of an aircraft fitted with the seat crashing;

FIG. 5 is a rear perspective view of the seat of the type shown in FIGS. 1 to 3, with the seat bucket being removed, showing the means provided in the seat to adjust the height of the bucket; and FIG. 6 shows a detail of FIG. 5, illustrating a ratchet mechanism included in the means for adjusting the height of the bucket.

DETAILED DESCRIPTION OF THE PREFERRED EMBODIMENT

Figure 1:
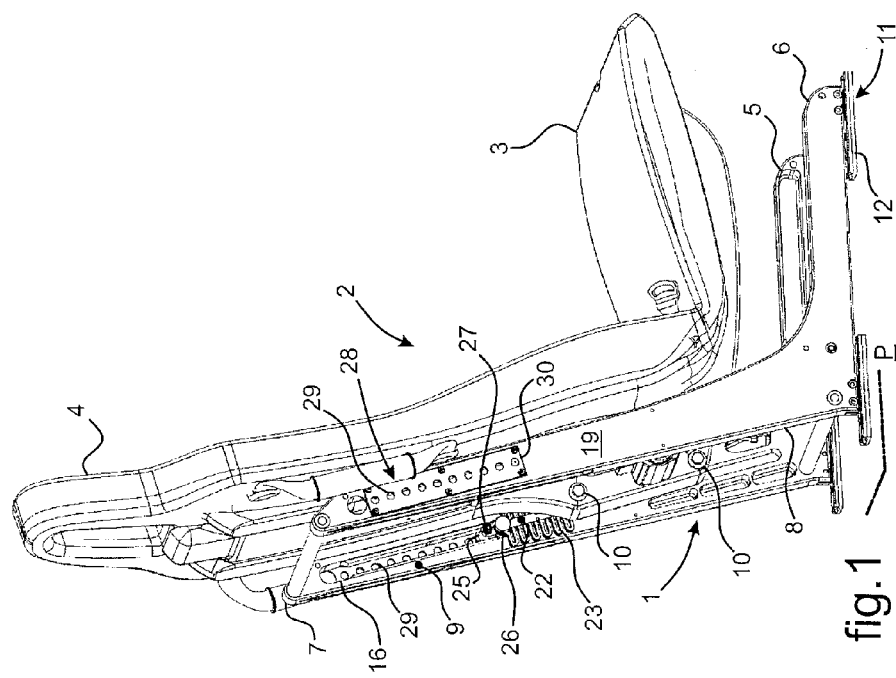
Figure 2:
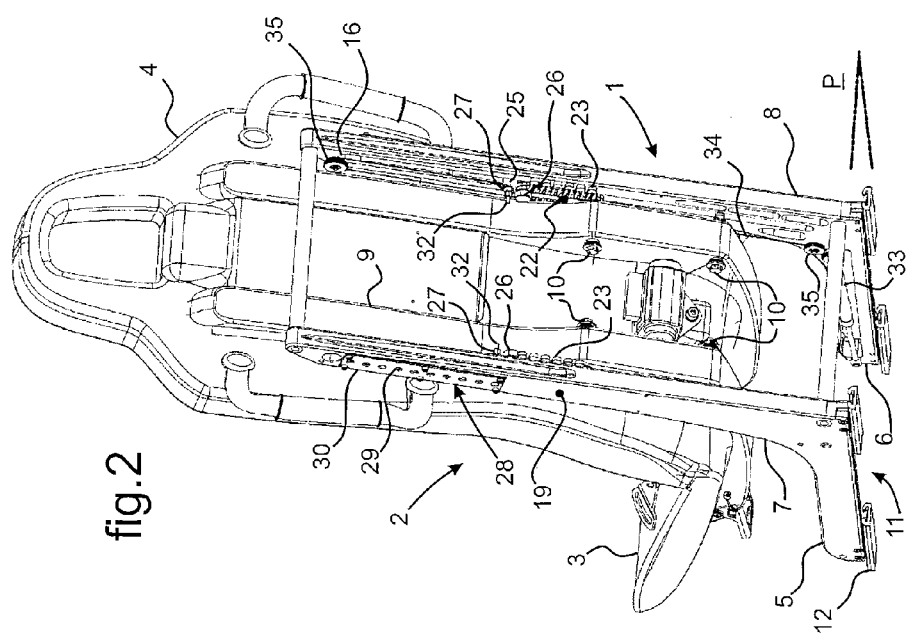

In FIGS. 1 to 3 a seat is designed for fitting to a powered aircraft, and it is arranged to protect the passenger sitting on the seat in the event of a violent impact, and more particularly in the event of the aircraft crashing. The seat is made up mainly of a stand 1 that supports in a hyperstatic manner a bucket 2 comprising a seat proper 3 and a seat back 4. The stand 1 is made up mainly of two foot members 5, 6 spaced apart laterally so as to define between them a plane P for installing the seat on the floor of the aircraft. Each of these foot members 5, 6 is extended by a respective leg member 7, 8 extending behind the seat back 4 in order to support the bucket 2. The bucket 2 is fitted with a strength member 9 made up of beams that extend under the seat 3 and behind the back 4. The beams of the strength member 9, in their zone where they are connected to the back 4, extend beside the legs 7, 8 so they can be pinned together in pairs using bolts 10. In order to ensure that the bucket 2 is supported in hyperstatic manner, there are four of these bolts 10 distributed on either side in pairs, with each pair occupying a respective zone of the back 4 that is high or low relative to the utilization position of the seat.

Preferably, the seat is fitted with means 11 for adjusting its longitudinal position forwards and/or rearwards relative to the orientation of the passenger sitting on the seat. These longitudinal position adjustment means 11 are generally constituted by rails 12 or analogous members that are provided with members for fastening them to the floor of the aircraft and that slidably receive the foot members 5, 6. The seat is suitable for being fitted with drive means dedicated to sliding the foot members 5, 6 along the rails 12.

In FIGS. 1 to 6, the seat is fitted with a first mechanism for geometrically compensating deformation of the floor, which means are dedicated to protecting the passenger in the event of the installation plane P of the seat deforming as a result of the floor of the aircraft deforming. The passenger protection provided by the first mechanism is implemented over a given range of resistance to deformation of the seat, corresponding to either foot member tilting longitudinally up to about 10° on either side of the installation plane P of the seat.

The bolts 10 are axially deformable under the effect of stress exerted on the seat as a result of the foot members 5, 6 deforming in the intended range. Elastic deformation of the bolts 10 is limited between two abutment positions, one in a deployed position of the bolts 10 and more particularly of their members 14, corresponding to a condition of normal use of the seat, and the other in an extreme retracted position of the bolts 10 and more particularly of their members 14, corresponding to at least one of the foot members 5, 6 deforming over the intended range of ±10° on either side of the installation plane P of the seat on the aircraft, defined relative to the initial orientation of the foot members 5, 6.

Each bolt 10 is arranged as a pair of members having a tilt pin 13 and a resilient sleeve 14 that is axially deformable and that is engaged on the tilt pin 13. The resilient sleeve 14 is made up of a set of stacked and independently-deformable washers, that are dish-shaped, constituting so-called "Belleville" or "spring" washers. The tilt pin 13 has a ball-joint head 15 that is received in a dedicated housing 16 included in the corresponding leg member 7, 8. Each of these housings 16 presents an extension along the leg members 7, 8 that is at least sufficient to accommodate omnidirectional movement of the tilt pins 13 through about ±5°. The shape of the ball-joint head 15 on each tilt pin 13 is limited to enabling it to tilt through about the same angle. Such a range of omnidirectional movement for the tilt pins 13 is sufficient to enable the first mechanism to operate over the intended range of deformation of the foot members 5, 6.

The tilt pins 13 have shoulders 17, 18 at each of their end faces in order to bear in opposing manner against the corresponding leg member 7, 8 and against the strength member 9 of the seat back 4. One of the shoulders 17 is made by machining, while the other shoulder 18 is obtained by fitting a washer or an analogous member to the end of the tilt pin 13.

In the embodiment shown, the resilient sleeve 14 is interposed between one of these shoulders 17, 18 and the strength member 9 of the back.

In the event of at least one of the foot members 5, 6 deforming, then at least one of the tilt pins 13 pivots in its housing 16 in the leg member 7, 8 that receives it, thereby having the effect of elastically deforming it in compression and of causing it to slide inside a recess 20 included in the strength member 9 of the back 4. In order to ensure that the tilt pin 13 is slidably mounted on the strength member 9 of the back 4, the tilt pin 13 extends inside a bushing 21 fitted inside the strength member 9. During axial deformation of a bolt 10 to the extreme-compression position of the member 14, the opposing axial thrust pressing the bolt 10 against the corresponding leg member 7 and the strength member 9 of the back 4 continues, so the bucket 2 continues to be supported in hyperstatic manner in its normal utilization position.

The housings 16 for receiving the bolts 10 that are formed through the leg members 7, 8 are open to the outside in order to make it easier to mount the bolts 10. In order to avoid the housings 16 deforming under the effect of the stresses to which the seat is subjected during a crash, each of these openings is preferably closed by a fitted cap 19 that also constitutes a member for reinforcing the walls around the housings 16. Such caps 19 serve to reinforce the housings 16 so as to avoid them deforming by their walls moving apart, and so as to prevent the ball-joint head 15 escaping undesirably from the housings 16, which would otherwise run the risk of being made possible in the event of the walls of the housings 16 deforming.

The seat is also fitted with a second mechanism for absorbing energy induced by a sudden change in the speed of the aircraft in the event of a crash, in order to protect the passenger from this sudden change of speed, in particular from deceleration. This second mechanism is more particularly arranged to allow relative movement between the bucket and the stand in the long direction of the leg members, while continuing to support the bucket 2 in hyperstatic manner.

The respective implementations of the first and second mechanisms are independent in spite of them advantageously being made up with members in common, in particular the bolts 10 and the housings 16. More particularly, the second mechanism is suitable for functioning before, simultaneously with, or after functioning of the first mechanism. The second mechanism comprises two sets of members, each associating a fuse 22 for retaining the bucket 2 and a plastically-deformable support member 23 for the bucket 2. These two sets of members 22 and 23 are distributed laterally so as to be individually engaged on the bucket 2 and on a dedicated leg member 7, 8. The fuses 22 are arranged as strips or analogous members, each including a zone of weakness 24 suitable for breaking as from a rupture threshold. The rupture threshold is predetermined and depends on a tolerated optimum threshold for stresses exerted on the seat.

The vertically-deformable support members 23 of the bucket 2 are generally flat, being disposed along a dedicated leg member 7, 8 and they are stretchable under the effect of the weight of the bucket 2 plus the weight of the passenger. Such embodiments for fuses 22 and/or plastically-deformable support members 23 are preferred and illustrated by way of example, but it is possible to implement other means that are analogous. For example, the support member 23 for the bucket 2 may be constituted by a spontaneously closed pneumatic actuator that is provided with a rated valve constituting a fuse that is suitable for releasing the pneumatic actuator to deploy as from a certain strength threshold.

The sets of members each combining a fuse 22 and a plastically-deformable support member 23 engage a dedicated leg member 7, 8 and the strength member 9 of the seat back 4. The sets of members 22, 23 are engaged on the dedicated leg member 7, 8 via a pin 26 that is received in the dedicated leg member 7, 8. The sets of members 22, 23 are engaged with the strength member 9 of the back 4 via the bolts 10. The housings 16 for receiving the ball-joint heads 15 extend along the corresponding leg member 7, 8, preferably with these housings 16 running into one another so as to form a common housing that receives both of the bolts 10 that are provided on the same side of the bucket 2. The housings 16 are arranged as a passage for passing the bolts 10, e.g. passing the ball-joint heads 15 they include.

In the preferred embodiment that is shown, the housings 16 are formed by hollowing out a slideway that is made from a channel-section member or the like. The cap 19 is constituted by a plate that is fitted against the opening of the slideway, e.g. by welding or by adhesive bonding, for the purpose of closing the opening and reinforcing the flanges of the section member.

In the event of a crash, the seat is subjected to energy that is induced by the sudden deceleration of the aircraft. The fuse 22 gives way and the bucket 2 is carried by the plastically-deformable support members 23. By being stretched, the plastically-deformable support members 23 allow the bucket 2 to move down along the leg member 7, 8 over a predetermined stroke as the support members 23 lengthen depending on the weight of the passenger and the energy to be absorbed. The bucket 2 is guided in its downward stroke by the bolts 10 that move along the respective housings 16 that receive them. The bucket 2 continues to be supported in a hyperstatic manner and the passenger is protected by the support members 23 absorbing energy.

In FIGS. 1, 2, 5, and 6, the seat is advantageously fitted with means for adjusting the height position of the bucket in normal utilization. These means seek to increase passenger comfort, in particular when the passenger is one of the pilots of the aircraft. These means for adjusting the height position of the bucket comprise a ratchet mechanism that implements a set of two pawl fingers 27 associated with respective ones of the dedicated leg members 7, 8. In order to make it easier to incorporate the height adjustment means in the seat without excessively complicating its structure nor increasing its size, the ratchet mechanism is interposed between the stand 1 and the bucket 2 by making use of members forming parts of the first and second mechanisms. More particularly, the pawl fingers 27 carry the bucket 2 via the bolts 10, the fuses 22, and the pins 26 to which the pawl fingers 27 are connected via a corresponding slider 25.

The sliders 25 are received in the housings 16 for receiving the bolts 10 and along which they are suitable for traveling. The pawl fingers 27 co-operate individually with respective racks 28 of notches 29 associated therewith. These racks 28 of notches 29 are constituted by holes that are formed through respective plates 30 fitted on each of the leg members 7, 8.

The pawl fingers 27 can be moved in alternation between a spontaneous notching position inside one or the other of the notches 29 of the rack 28 associated therewith, and a disengagement position where the pawl fingers 27 are outside the notches 29. The pawl fingers 27 are maintained in the spontaneous notching position by means of a dedicated resilient return member 31, and they can be extracted by means 32 for driving them into the disengagement position against the force exerted by the resilient member 31. These means 32 for driving the pawl fingers are of the pull rod or analogous type, e.g. associating a first traction cable engaged on the pawl fingers 27 and a handle enabling the passenger to exert traction on the first cable, for example.

In FIG. 5 in particular, the means for adjusting the height position of the bucket 2 also include at least one drive member 33 for driving the bucket 2 into a spontaneous optimum height position. This member 33 for driving the bucket 2 engages the bucket and is rated to a predetermined force depending on the maximum acceptable weight for a passenger. In the advantageous embodiment shown, the member 33 for driving the bucket 2 is constituted by a pneumatic actuator housed in the underside of the seat between the foot members 5, 6. This drive member 33 is spontaneously closed and it is connected to the bucket 2 via a second traction cable 34 that passes over a set of deflector pulleys 35 carried by the stand 1 and engaging at least one of the carrier slides 25 of the second mechanism.

In order to adjust the height of the seat, the passenger sits in the seat and drives the pawl fingers 27 towards their disengaged position. The bucket 2 then tends to move vertically under the effect of the spontaneous traction exerted by the drive member 33 of the bucket 2. When the bucket 2 is in the height position desired by the passenger, the passenger releases the pawl fingers 27 that are driven spontaneously by the corresponding resilient members 31 into the notching position so as to secure the bucket 2 to the stand so that it is held in hyperstatic manner.

What is claimed is:

1. A seat for a powered aircraft, the seat comprising a bucket held in hyperstatic manner on a stand, the bucket being made up of a seat with a seat back rising therefrom, and the stand comprising foot members for anchoring the seat in its utilization position on an installation plane (P), leg members being secured respectively to the foot members and together carrying the bucket pinned thereto via axially extending bolts, one of the ends of each bolt being engaged with a strength member of the seat back while the other end of each bolt engages a dedicated leg member, wherein the seat is fitted with a first hinged mechanism for geometrically compensating deformation of the floor, the mechanism associating a ball-joint connection between the bolts and one of the strength member of the seat back and the dedicated leg members, with the bolts being arranged to deform axially between opposing axial thrusts each of them applies against the strength member of the seat back and the dedicated leg member.

2. A seat according to claim 1, wherein the bolts are axially deformable over a predefined stroke between two axial abutment positions.

3. A seat according to claim 1, wherein a spherical bearing surfaces of the bolts engaging one of the strength member of the seat back and the dedicated leg members are limited to a range of 3° to 7°.

4. A seat according to claim 1, wherein each of the bolts is arranged as:
   a tilt pin provided with shoulders in axially opposing thrust engagement against the leg member and the strength member of the seat back, and provided with a ball-joint head suitable for co-operating with a housing provided in one of the strength member of the seat back and the dedicated leg members; and
   at least one axially deformable resilient sleeve engaged on the tilt pin, being axially interposed between either one of said shoulders and respectively the dedicated leg members and the strength member of the seat back against which it bears.

5. A seat according to claim 4, wherein the resilient sleeve is made up of a stacked set of dish-shaped washers of the "Belleville" type.

6. A seat according to claim 4, wherein the housings receiving said ball-joint heads are blind housings suitable for preventing the corresponding ends of the tilt pins from escaping from the housings that receive them.

7. A seat according to claim 1, wherein the bolts are mounted as ball joints within said housings included in the leg members, and they are mounted to be movable inside respective axial recesses included in the strength member of the seat back.

8. A seat according to claim 1, that is fitted with a second mechanism for absorbing energy induced by a sudden change in the speed of the aircraft.

9. A seat according to claim 8, wherein the second mechanism comprises at least two sets of members, each associating a fuse for retaining the bucket and holding it in a hyperstatic manner, and a deformable member for supporting the bucket, each set of members together engaging a dedicated leg member and the strength member of the seat back.

10. A seat according to claim 9, wherein the fuse and the support member of each of the sets of members are engaged on the associated bolt and on the dedicated leg member, and wherein a housing for receiving a ball-joint head of the bolt extends along said dedicated leg member.

11. A seat according to claim 9, further including means for adjusting the height position of the bucket.

12. A seat according to claim 11, wherein the means for adjusting the height position of the bucket comprise a ratchet mechanism associating at least one set of two pawl fingers carrying the bucket and each associated with a dedicated leg member, having notches arranged as a rack for receiving the pawl fingers in alternation, which notches are arranged in succession along each of the leg members.

13. A seat according to claim 12, wherein each of the pawl fingers carries the bucket via a bolt associated therewith and with which they engage.

14. A seat according to claim 13, wherein the pawl fingers engage the bolts via the corresponding second mechanisms.

15. A seat according to claim 12, wherein the pawl fingers are movably guided by means of slides that support them respectively and that are mounted to slide along corresponding slideways formed through the leg members.

16. A seat according to claim 15, wherein the slides also constitute members for engaging the sets of members of the second mechanism with the leg members, the slideways receiving the slides being constituted by the housings for receiving the bolts.

17. A seat according to claim 12, wherein the height position adjustment means of the bucket comprise means for driving the pawl fingers between a spontaneous notching position in which the pawl fingers are received in one of said notches of the corresponding rack, and a disengagement position in which the pawl fingers are extracted from the notches.

18. A seat according to claim 17, wherein the drive means for driving the pawl fingers comprise a traction member for applying traction on the pawl fingers urging them into the disengagement position against an opposing force exerted by a resilient member for spontaneously driving the pawl fingers into a notching position.

19. A seat according to claim 18, wherein the traction member is of a manually operable pull rod type.

20. A seat according to claim 11, wherein the height position adjustment means of the bucket comprise at least one drive member for driving the height position of the bucket.

21. A seat according to claim 20, wherein the drive member for driving the bucket comprises a member for spontaneously driving the bucket to an optimum height position, which member is rated at a predetermined force.

22. A seat according to claim 20, wherein the drive member for driving the bucket is placed in the underside of the seat defined between the foot members and engaging at least one of the pawl fingers via a cable running over a set of defector pulleys mounted on the stand.

* * * * *